Nov. 1, 1960 E. J. GLENNER ET AL 2,958,850

KEYSENDER USING MAGNETIC DRUM STORAGE

Filed Aug. 23, 1956 5 Sheets-Sheet 1

INVENTORS
EDWARD J. GLENNER
IMRE MOLNAR
BY *[signature]*
ATTY.

Nov. 1, 1960 E. J. GLENNER ET AL 2,958,850

KEYSENDER USING MAGNETIC DRUM STORAGE

Filed Aug. 23, 1956 5 Sheets-Sheet 2

INVENTORS
EDWARD J. GLENNER
IMRE MOLNAR
BY Mc Walter Owen

ATTY.

Nov. 1, 1960 E. J. GLENNER ET AL 2,958,850

KEYSENDER USING MAGNETIC DRUM STORAGE

Filed Aug. 23, 1956 5 Sheets-Sheet 3

INVENTORS
EDWARD J. GLENNER
IMRE MOLNAR
BY [signature]
ATTY.

INVENTORS
EDWARD J. GLENNER
IMRE MOLNAR
BY
McWatters Owen
ATTY.

INVENTORS
EDWARD J. GLENNER
IMRE MOLNAR
BY [signature]
ATTY.

United States Patent Office 2,958,850
Patented Nov. 1, 1960

2,958,850

KEYSENDER USING MAGNETIC DRUM STORAGE

Edward J. Glenner and Imre Molnar, Chicago, Ill., assignors to Automatic Electric Laboratories, Inc., a corporation of Delaware Filed Aug. 23, 1956, Ser. No. 605,750

4 Claims. (Cl. 340—172.5)

This invention relates to the storing of digits by methods which can be readily used in telephone systems for the storage and transmission of the digits of a called number.

More specifically the present invention utilizes a magnetic storage medium in the form of a drum of the general type shown in Patent 2,614,169 issued October 14, 1952 to A. A. Cohen et al. The drum storage unit would be utilized with a telephone operators' keyset and circuits of the general type shown in the copending application 576,262 filed April 5, 1956 by Mr. I. Molnar, now Patent No. 2,881,261, issued April 7, 1959. The storage of digits in the cited application is accomplished through the use of coded relay storage groups. Naturally, one relay group is required for each digit to be stored so that for a five digit message, five groups of relays would be required.

The present invention requires one drum per operator's position and would be capable of storing five five-digit messages and this capacity is limited by the control apparatus and sending equipment shown rather than the drum facilities. The capacity of the present invention could readily be doubled and even further expanded, but the basic operation of the system remains the same.

The main object of the present invention is to provide a storage medium for the systematic recording and transmission of coded digits.

Another object of the present invention is to provide a method whereby, during the recording of digits on a magnetic drum, the transmission mechanism is locked out of possible operation until the release of the recording mechanism.

A further object of the invention is to provide a checking circuit which insures that the sequence of transmission of digits from the drum is the same as the sequence of the digits recorded.

One of the features of the invention is a scheme whereby an indication is transmitted to the drum mechanism whenever necessary to note that additional digits are waiting to be transmitted and maintaining this notice condition until all stored digits have been transmitted.

Figure 1:
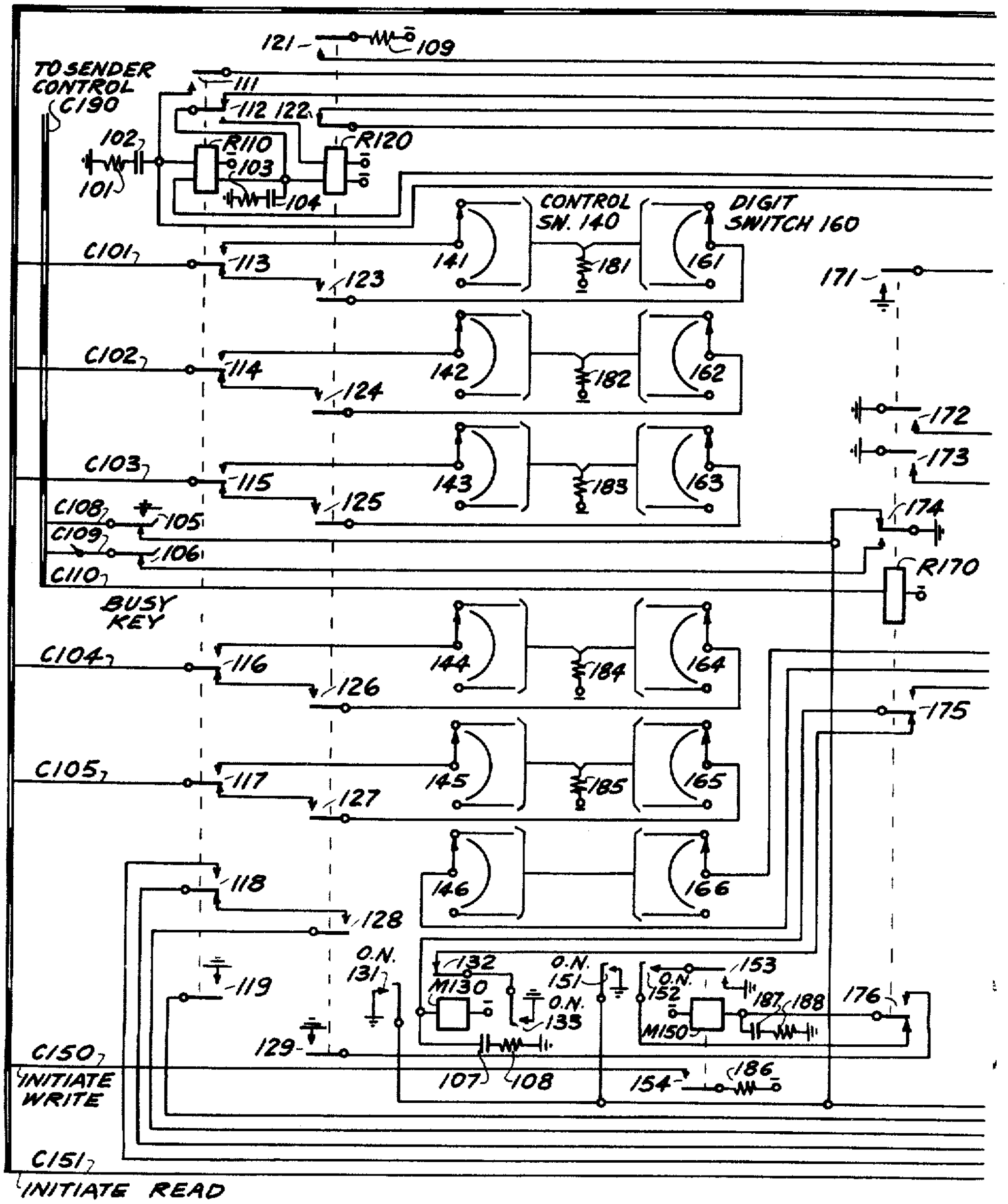
Figs. 1, 2 and 3 show the keysender circuit as modified to replace Figs. 34, 35 and 36 of the cited copending application. In that application the information is stored in coded relay storage groups and transmitted as required.
Figure 2:
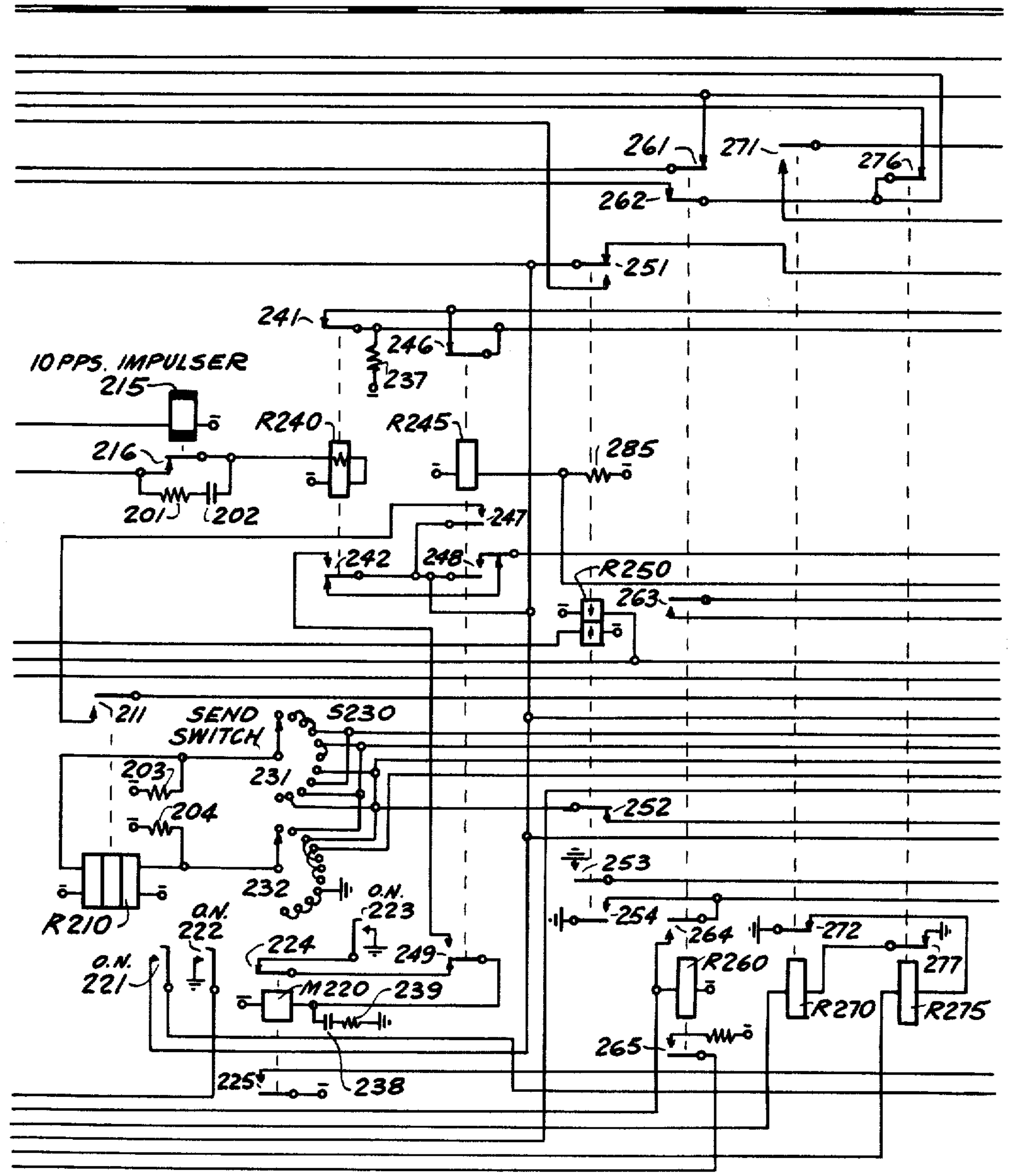
Figure 3:
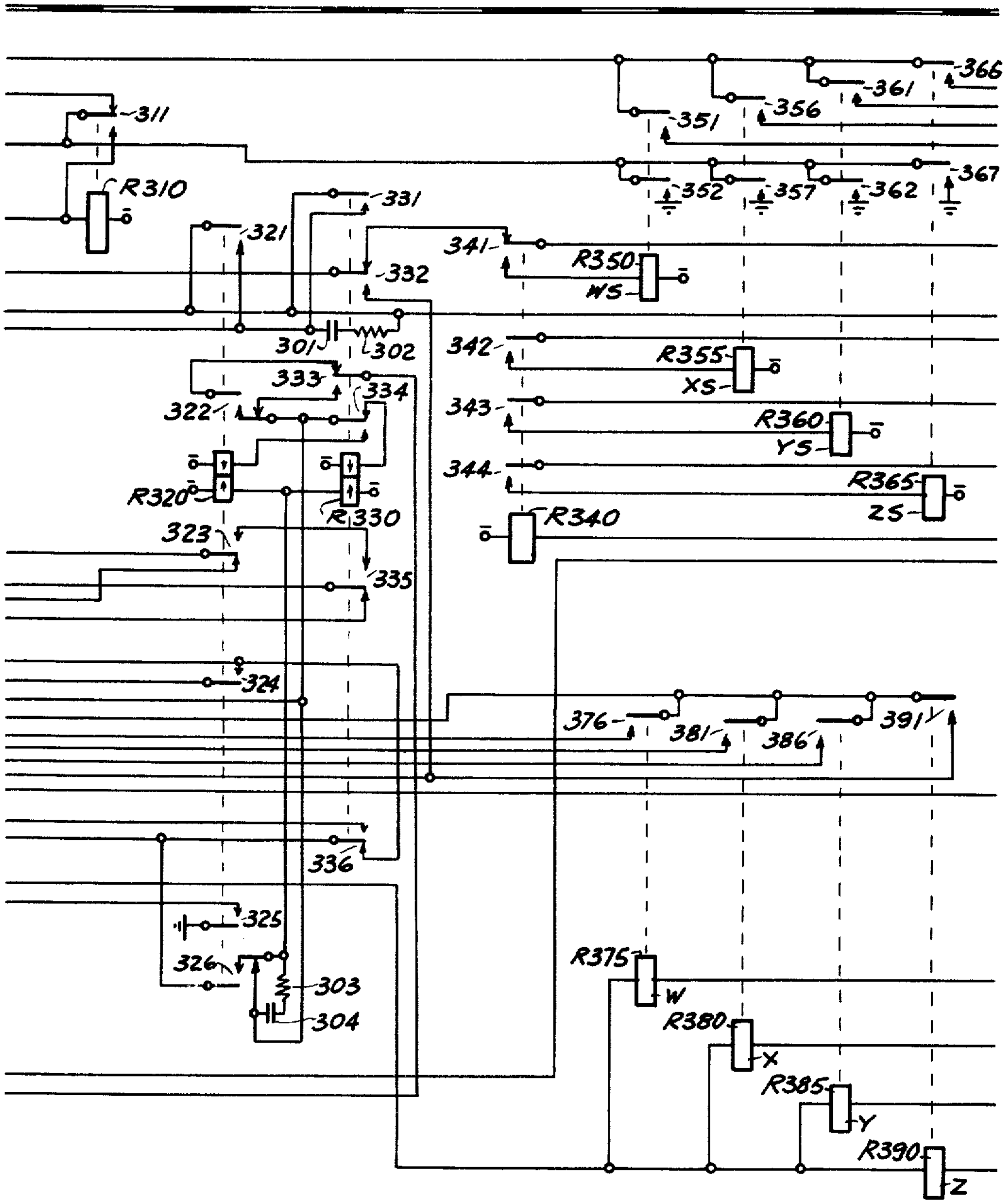
Figure 4:
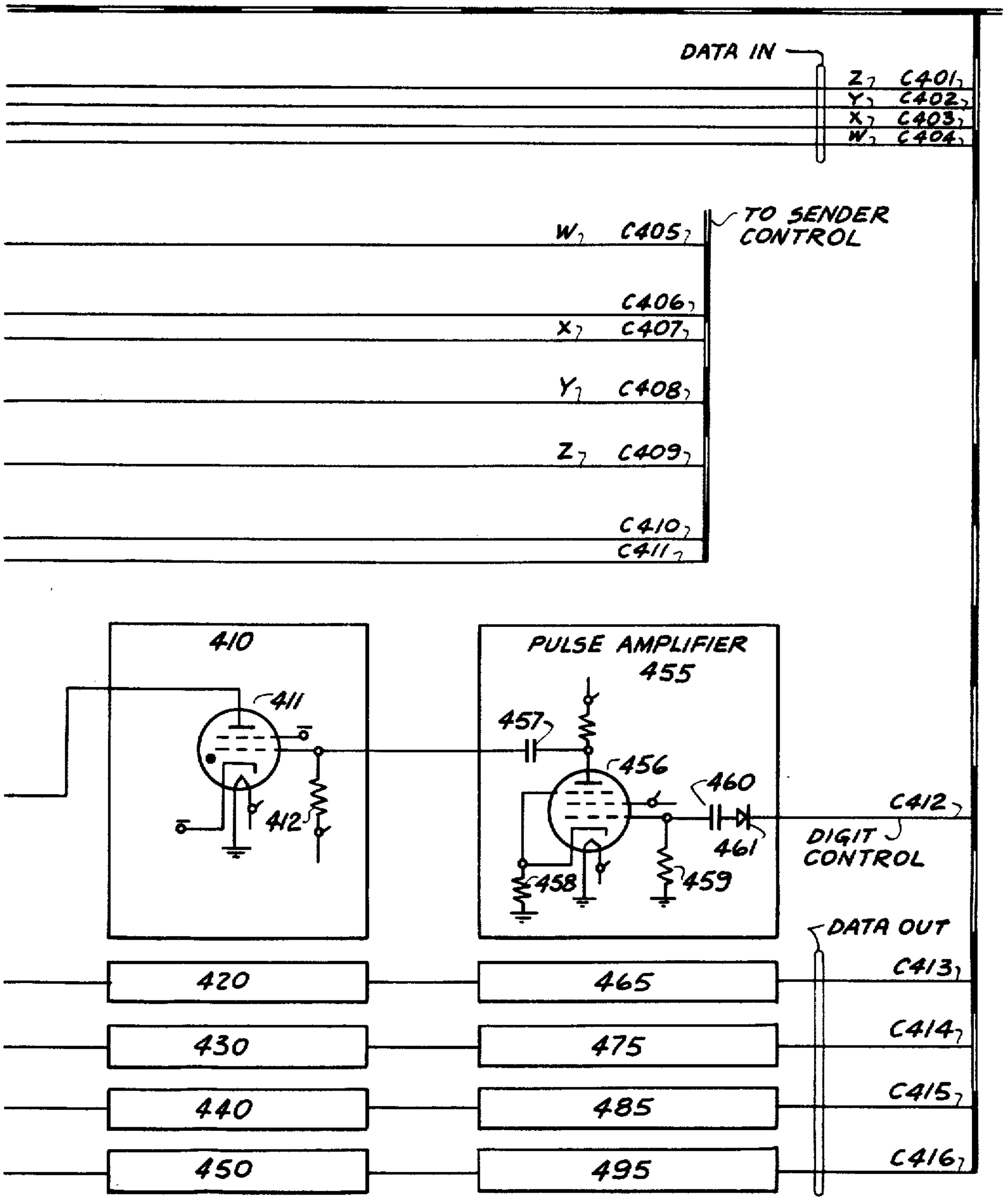
Fig. 4 shows the thyratron amplifiers required to amplify pulses received from the drum for transmission and control.
Figure 5:
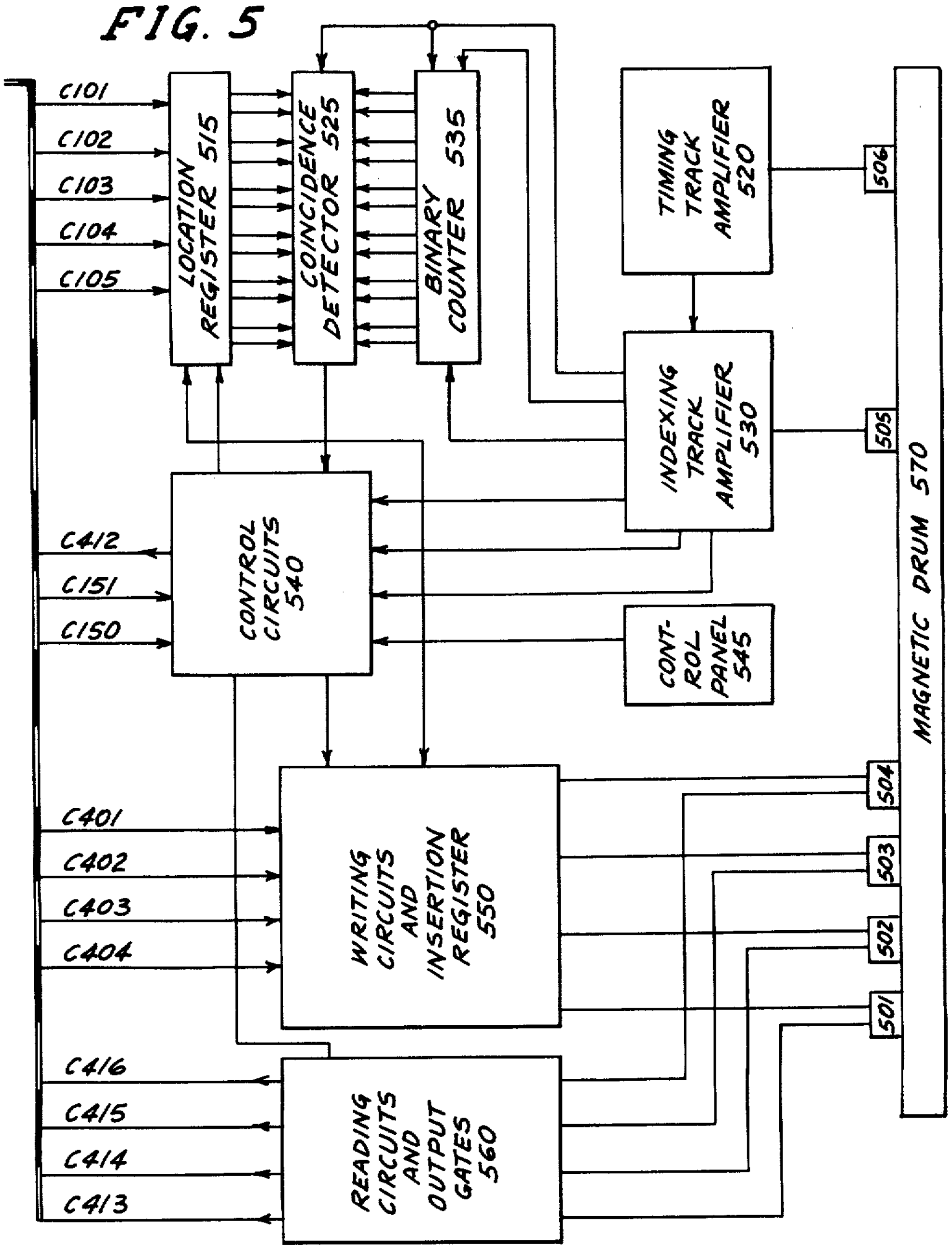
Fig. 5 shows in block form the drum and drum control circuits necessary for the present use.

The drum and drum control circuit described in the following specification differ from those in the cited patent in certain features which can be seen from the brief description that follows explaining the drum and control circuits of Fig. 5.

The magnetic drum itself consists of a large rotating magnetizable medium placed on the peripheral surface of a drum. Bits of information are stored on the drum by magnetizing small sections or spots. These spots may be considered as forming parallel tracks around the cylindrical surface of the drum. In each track as many as 75 spots per inch can be magnetized with the drum rotating at a speed of at least 1700 revolutions per minute. There are six or more tracks available on the drum although six tracks are the extent of the use described herein. Four tracks are provided for recording of coded binary information. Adjacently located to sweep out each track is a combined "reading-writing" magnetic coil or head. This is of course the means for magnetizing desired spots on the track as the "writing" or storage operation takes place and inducing a current in the head as the "read" or transmission occurs. A fifth or indexing track is provided and has a spot permanently magnetized into the track for providing a start pulse and having another permanently magnetized spot 300° of revolution later as an end pulse. Adjacent this track is a reading head to receive the pulses at those points of revolution.

The sixth track is a timing track having a series of evenly spaced spots on the track magnetized permanently and thereby providing timing pulses to the reading head adjacent to this track.

Before starting the explanation of the storing of digits as applied herein, a short explanation of Fig. 5, the magnetic drum and its control circuits will be given.

From the timing track, as previously mentioned, a series of timed pulses are picked up by magnetic head 506 and amplified in the timing track amplifier 520. These pulses are sent to the indexing track amplifier 530 for synchronization with the indexing track pulses as received by pick-up head 505. When the end pulse appears in the amplifier 530, the binary counter 535, is cleared of all digits and is reset by the start pulse. After the start pulse, the timing pulses are fed through amplifier 520, gated and shaped in amplifier 530 and fed to binary counter 535. This counter consists of six flip-flop circuits and naturally has a capacity of $(2)^6$ or 64. In the present application only 25 peripheral locations on the track are used as limited by the external equipment.

After each drum operation, either reading or writing, a "digit control" pulse is originated in the control circuits 540 to notify the relay equipment through lead C412 that the operation is completed. Concurrent with this pulse, another pulse from the control circuits 540 is sent to the location register 515 to clear the prior location.

When a digit is ready to be stored, a number of actions occur simultaneously. First the location on the drum where the information is to be stored is sent to the location register on leads C101—C105 to condition these five flip-flop circuits. Coincident with this occurrence, the digit to be stored is sent in the form of the WXYZ code to the writing circuits and insertion register 550 and stored there pending notice to start writing on the drum. An "initiate write" pulse is then sent on lead C150 to the control circuit 540.

During this period the binary counter 535 is counting the timing pulses from the timing track as received through the timing track amplifier 520 and the indexing track amplifier 530. When the location on binary counter 535 agrees with that shown by the location register 515, a coincidence pulse is originated in coincidence detector 525 and sent to the control circuits 540. The control circuits, in response, originate a write pulse on receipt of the first coincidence pulse after the "initiate write" pulse. This write pulse is sent to the insertion register 550 and the binary digits being stored in the tracks are magnetized at the marked location on the drum by the required heads 501—505. A digit control pulse is then sent clearing the location register preparing it for the next digit to be stored or removed. As many digits as are required may be stored in the same manner.

When it is required that digits be read, an initiate read pulse is sent on lead C151 to control circuits 540. The location register 515 has already been cleared and the location of the first digit to be read is impressed on the location register. Again when the binary counter 535 coincides with the location of the digit to be read, the coincidence detector 525 emits a coincidence pulse to the control circuit 540. A read pulse is thereupon sent to the reading circuits and output gates 560 and the digit is read on the proper magnetic heads 501—504 from the drum tracks and sent to the required destination. A digit control pulse follows.

Naturally these operations as described take but a few micro-seconds from start to finish and the response is such that digits are stored in the proper locations and removed with no errors.

*Storing digits*

The operation of the entire circuit to place the digits on the drum is as follows: as in the cited copending application, the sender which is the present circuit is seized by actuation of two relays, shown as R170 and R340 of the present invention. At contacts 174, ground is sent back to the sender control to mark the sender as seized. At contacts 172, the ten pulses per second impulse source 215 is closed to ground. This impulse source is used to convert the binary output of the magnetic drum into the standard interrupted D.C. pulses required by the further switching apparatus. On the operation of relay R340, the coded digit receiving leads C405, C407, C408 and C409 from the sender control are closed through contacts 341—344 to the code receiving relays R350, R355, R360 and R365.

The operator then depresses the key corresponding to the first digit to be transmitted. Assume the digit to be transmitted is the number 5. Relays R355 (XS) and R365 (ZS) will then operate from ground at the keyset. At contacts 356 and 366, ground is closed to relay R120 over a path from ground, contacts 311 and 112 to lower winding of relay R120 and battery. On operation of relay R120, contacts 121 close, placing battery through resistor 109 to the closed contacts 356 and 366 and to leads C403 and C404 respectively. Lead C403 is the lead to the "X" track on the magnetic drum and lead C401 is the lead to the "Z" track. These battery pulses on leads C401 and C403 store these binary digits on insertion register 550.

Coincident with this, the location register 515 must be marked with the location on the drum at which the digit is to be stored. This function is accomplished by the use of a 25 point multi-level digit switch S160. Each level of this switch is connected to one of the flip-flop circuits of the location register. The levels of switch S160 have been strapped such that each contact provides a pulse or blank to the location register 550 indicating through the use of all five levels by binary notation on which contact the switch wiper is resting. Contact #1 corresponds to location #1, contact #2 to location #2 and so on to the final contact #25 being location #25. When switch S160 is resting on the first contact the location register receives a single pulse on lead C101 identifying the location at which the digits are to be stored as location #1. This battery current pulse is sent through register 181, level 161, closed contacts 123, 113 and on lead C101 to the flip-flop of the location register. The levels of switch S160 and an identical control switch S140 are wired back-to-back to provide the same binary code location to the location register 550 for transmission as for recording.

As previously mentioned, relay R120 has operated and closed its contacts 129 placing ground through closed contacts 176 to motor magnet M150. A pulse is thereby sent from battery through resistor 186 and closed interrupter contacts 154 on lead C150 the "initiate write" lead to the control circuits 540. When the coincidence pulse is received as described previously, the stored digit is magnetized onto the drum surface at location #1.

The magnetic drum control circuit then sends a pulse to the pulse amplifier stage 455 by way of the "digit control" lead C412. Pulse amplifier 455 amplifies the small pulses sent from the control circuit of the magnetic drum. The control circuit, on initiation of the "digit control" pulse clears the location register of the location of the last stored digits.

All pulses are received from the control circuit at a potential of about two volts and last for a duration of about one fourth of a micro-second and hence must be amplified. Upon receipt of the amplified pulse from amplifier 455, thyratron 411 of amplifier 410 fires, completing a circuit to relay R270 over a path from the thyratron through open contacts 118, closed contacts 128, relay R270 and closed contacts 277 to ground. On operation of relay R270, an operate path is closed to relay R310 over a path from the multiple ground at 357 and 367, through closed contacts 271 to relay R310 and battery. Relay R310 on operation opens the operate path to relay R120 at contacts 311. Relay R120 releases, opening the operate path to motor magnet S150 of switch S160 at contacts 129, and switch S160 steps to the next "write" location which would be #2 location. The pulse to the "data in" leads C401 and C403 would be opened at contact 121 by the release of relay R120 causing the release of relay R270. When the digit button 5 is released, relay R355 and R365 restore as does relay R310. The total elapsed time of this sequence is about 40 milliseconds. The first digit of a series has thus been stored at location #1 and the circuit is then ready to receive further digits for storage or to remove the digit already stored. If an additional digit or digits are then to be stored, a similar operation or operations occur. The contacts of switch S160 are then resting on contacts #2 when relay R120 again operates, the location register therefore receives a pulse signifying location #2, etc.

*Sending*

When the digit switch S160 has stepped to the #2 bank contact after one storing or further, and the control switch S140 is still resting on its #1 bank contact (no reading having occurred), the differential relay R250 operates. Its lower winding is normally energized over a path through #1 bank contact of level 166 of switch S160 which is wired back-to-back to the #1 bank contact of level 146 of switch S140 to contacts 336 and ground at closed contacts 171. The upper winding is energized over a path directly to contacts 336, 171 and ground. As previously mentioned when switch S160 has stepped to the #2 bank position or further, the lower winding path is opened at the back-to-back switch wiring while the upper winding remains energized and causes the relay R250 to operate. At contacts 253, ground is sent to the W, X, Y, and Z relays R375, R380, R385 and R390.

Relay R110, the "read out" control relay, then operates over a path through contacts 262, 276, 122, 251 and 171 to ground. It should be noted that relay R110 cannot operate until relay R120 has released closing its contacts 122 so that the "read out" sequence which follows can begin. If relay R120 has reoperated to store a second digit, then relay R110 cannot operate until relay R120 has released.

At contacts 112 the operate path to relay R120 is further opened so that depression of the key at the keyset will not start a writing operation until relay R110 has released. At contacts 113, 114, 115 and 116, the location register information on leads C101—C105 from the magnetic drum control circuit are shifted to the wipers of switch S140, the control switch. At contacts 118 the winding of relay R275 is closed to the anode of thyratron 411. At contacts 119 ground is closed to relay R260. Relay R260 operates. At contacts 263, relay R245 is closed to ground over a path through contacts 335, 263, 323, 248, 242, ON 151, to ground at contacts 171. Also, relay R260 locks itself operated through contacts 264.

At contacts 265, which have been closed, an "initiate read" pulse is sent to the drum control circuit 540. Information read at the correct drum location by means of the binary counter system, is transmitted on the proper leads C413, C414, C415 and C416. For the digit 5 stored, a pulse is sent from heads 502 and 504 through the output gates 560 on leads C414 and C416. These pulses cause amplifiers 475 and 495 to operate thereby firing thyratrons 430 and 450 thus completing the circuits to relays R380 and R390 respectively. These relays operate closing contacts 381 and 391 respectively. At contacts 263 a path is closed to relay R245 as follows: ground, contacts 171, 242, 248, 323, 263, 335 to R245. Relay R245 operates and at contacts 249 locks itself operated. At contacts 246, the shunt across contacts 241 is removed preparing the transmission pulsing lead C406. At contacts 249, magnet M220 of switch S230 is placed under the control of contacts 242.

Impulser 215 is making and breaking at the rate of ten pulses per second. Contacts 216 are making and breaking at the same rate and relay R240 follows. Contacts 242 make and break at this rate also and magnet M220 then steps over the path through closed contacts 249, 242 to ground at contacts 171. At contacts 241, the pulses which have been stored on the drum are sent out on lead C406 during the open period of shunting contacts 246.

The digits which have been stored in a binary manner must be converted or translated into ten pulses per second direct current for this transmission. This is done by the use of levels 231 and 232 of switch S230 and shunt field relay R210. Shunt field relay R210 is used to detect simultaneous ground when the wipers of levels 231 and 232 engage bank contacts marked with ground. That is, both of its windings must be energized in order for relay R210 to operate. The bank levels of send switch S230 are wired in such a manner that the binary marking received from the drum are converted into the decimal equivalents by allowing switch S230 to count-off the number of steps corresponding to the digit which has been stored and is to be transmitted. For example, if the digit 5 is to be transmitted from the drum storage, relays R380 and R390 have operated, ground is placed from contacts 381 and 391 to ground the fifth bank contact on levels 231 and 232. It should be noted that only the fifth bank contact receives simultaneous ground on both levels when contacts 381 and 391 are closed and therefore switch S230 only takes five steps. Relay R210 is then actuated by the simultaneous ground and operates setting in motion the stopping mechanism for switch S230.

As mentioned previously, assuming the digit stored to be 5, relays R380 and R390 have operated their contacts 381 and 391. These closed contacts placed ground simultaneously on the sixth contact of both levels 231 and 232 of sending switch S230. When the switch has stepped onto the sixth contact having taken five steps from the first contact, the simultaneous ground causes shunt field relay R210 to operate. At contacts 211, ground at 171 is closed through contacts 247 and 211 to the upper winding of relay R330 and also through contacts 326 to the lower winding of relay R230 and R330. R330 then has its windings differentially energized and does not operate. Relay R320 cannot operate. At contacts 321, a shunt is closed across pulsing contacts 241 so that no pulses after the required five are transmitted. At contacts 322 the upper winding of relay R330 is shunted out. At contacts 323 the operate path to relay R245 is opened. At contacts 324, motor magnet M130 of control switch S140 is operated. At contacts 325, a ground locking path to relay R260 is closed.

Relay R245 restores. At contacts 246, the pulsing contacts 241 are further shunted out. At contacts 247 the previously described operate path to relay R320 is opened but relay R320 remains operated over a path through its own contacts 326 to ground at 171. Contacts 249 release, stopping the stepping of switch S230 and placing motor magnet M220 under the control of its interrupter springs 224 in the ground path to its off normal springs ON 223. Motor magnet M220 then operates switch S230 self-interruptedly to its normal or home position at which contacts ON 223 open. Relay R210 restores.

As contacts ON 221 open, the upper winding of relay R330 is opened and relay R330 operates on its lower winding. At contacts 335 a re-operate path for relay R245 is closed through contacts 323, 242, to ground at 171. At contacts 336, the 171 ground is closed through contacts 252 to provide simultaneous ground on the sixth contacts of bank levels 231 and 232. Also at contacts 336, the ground operate path through contacts 324 and 175 to motor magnet M130 is opened. Magnet M130 releases and control switch S140 steps once. Also at these contacts the operate path to relay R250 is opened.

Relay R250 then releases closing a path from ground at contacts 171 through contacts 336 and 252 to place simultaneous ground on the sixth contact of bank levels 231 and 232. At contacts 253, the ground operate path to relays R375, R380, R385 and R390 is opened. At contacts 254 the original locking path to relay R260 is opened but that relay holds operated over a path from ground at contacts 325 through contacts 264.

Relay R245 then reoperates and at contacts 249 again places motor magnet M220 under the control of impulsing contacts 242. As previously described switch 323 then is stepped self-interruptedly by motor magnet M220 until the sixth contact simultaneous ground is felt. During this period it should be noted that the shunt at contacts 321 and 331 is closed across pulsing contacts 241 and no pulses are sent on lead C406. This five count stepping of switch S230 provides an interdigital pause delay for the switching equipment to which the pulses are transmitted.

On the sixth contact relay R210 again operates stopping the further stepping of switch S230. At contacts 211 the upper winding of relay R320 is energized over a path from battery, relay R320 contacts 334, 211, 247, 171 and ground. This places the two windings of relay R320 in opposition and relay R320 releases. At contacts 323, the operate path to relay R245 is opened.

Relay R245 restores placing its shunting contacts 246 across the pulsing contacts 241. At contact 249, the homing circuit for switch S230 is closed to motor magnet M220. The switch thereupon steps to home self-interruptedly. When the switch reaches home, off-normal springs 221 open, deenergizing relay R330 and both windings of relay R320. Relay R330 then releases preparing the original operate path to relay R245 and removes its ground from the sixth bank position of levels 231 and 232 and energizes either one or both of the windings of R250.

When a pulse has been sent from the drum, the control circuits 540 send a digit control pulse on lead C412 through amplifiers 455 and 410, contacts 118, relay R275 to ground at contacts 272. On operation, relay R275 opens contacts 276 in the hold path to relay R110 which then releases restoring the sending relays.

As previously stated relay R250 operates by the energization of one winding when switches S140 and S160 are not resting on the same bank position thus indicating that there are digits stored waiting to be sent. If this be the case and relay R250 is operated another sending sequence occurs until all stored digits have been sent and the switches as mentioned are resting on the same bank position.

However, if additional digits are to be stored, the release of relay R110 allows relay R120 to operate on depression of the digit keys.

In this manner a digit or many digits may be stored and a digit or digits may be sent with each operation locked out during the other operation.

What is claimed is:

1. In an apparatus for storing and transmitting sequentially keyed digits, a preliminary storage unit having a single group of relays simultaneously responsive to the keying of a digit to store said digit, a write relay, a plurality of write control circuits under the control of said write relay, means responsive to the operation of said preliminary storage unit to operate said write relay, other means operated responsive to the operation of said write relay to activate said write control circuits, a temporary storage unit having a rotating magnetizable surface with a plurality of peripheral locations for storage on said surface, means for identifying said locations, location registering means comprising an in-digit step-by-step rotary switch having a plurality of bank contacts in parallel arcuate levels, each successive contact in the levels representing a separate predetermined location for storage of successive keyed digits, contact means responsive to the activation of said write control circuits for closing a path from the location register bank contacts to match said representations against said identifying means, means operative on identification of a location and coincidence of the registration from the indigit switch representing that location to transfer a keyed digit from the preliminary to the temporary storage over said write control circuits.

2. An apparatus as set out in claim 1 having a read control circuit for sequentially removing digits stored on said surface, said read control circuit including a read control relay having first and second contact means, said first contact means governed by the operation of said read control relay to disable said write relay from operation, an out-digit step-by-step rotary switch having its bank contacts wired individually to those of the in-digit switch to represent identical locations, means for matching said location registering means against a representation from said in-digit switch to cause a digit to be read from said surface over said second contact means governed by said read control relay, means operative after completion of a reading from said surface to release said read control relay.

3. In a telephone system, means for preliminary storage of successive keyed digits designating the number of a called party, said preliminary storage comprising a plurality of code relays operated simultaneously in various combinations in response to keying of different digits, a temporary storage stage comprising a rotating magnetizable drum surface, a plurality of preset successive peripheral locations each corresponding to each successive digit of said called number on said drum surface for sequentially storing said digits, a multiple means comprising operate path responsive to one or more of said relays operating to energize a write control relay, a rotary write switch having a plurality of bank contacts in parallel levels, successive bank contacts in said levels each representing a different rank of digits within the called party number, said successive contacts each also corresponding to a separate one of said preset locations, contact means controlled by the energization of said write relay to close said preliminary storage stage to said temporary storage stage to prepare for storage therein, means responsive to the operation of said write relay triggering said temporary storage stage into receiving and storing said keyed digit on said drum surface, said trigger means comprising a location register and means for matching registrations from said register against the corresponding positions from said rotary switch contacts to emit a triggering pulse on coincidence said matching to cause said digit to be stored on the drum surface.

4. An apparatus for storing and retransmitting keyed digits of a telephone number comprising a preliminary storage device operated successively in accordance with the value of each successive keyed digit, a temporary storage device comprising a constantly rotating magnetizable surface, a plurality of storage positions on said magnetic surface, means for writing on said surface, a writing step-by-step switch having a plurality of wipers and successive bank contacts accessible to each said wiper, coded marking means connected to the bank contacts of said writing switch corresponding to the respective storage positions on said surface, a location register for identifying the respective storage positions on said surface, means for stepping said writing switch wipers to successive ones of said bank contacts in response to each temporary storage of each succeeding digit of said telephone number, means dependent upon the position of said write switch wipers and said coded markings of the bank contacts engaged by said wipers for operating said location register to indicate a particular one of said storage positions, means effective in response to said particular one of said storage positions reaching its writing position for actuating said writing means under control of said preliminary storage device to transfer the keyed digit to said temporary storage device and means operated on completion of a temporary storage for releasing said preliminary storage device to enable the preliminary storage device to store the next keyed digit.

References Cited in the file of this patent

UNITED STATES PATENTS

| | | |
|---|---|---|
| 2,587,532 | Schmidt | Feb. 26, 1952 |
| 2,611,813 | Sharpless | Sept. 23, 1952 |
| 2,629,827 | Eckert et al. | Feb. 24, 1953 |
| 2,700,148 | McGuigan et al. | Jan. 18, 1955 |
| 2,764,634 | Brooks et al. | Sept. 25, 1956 |
| 2,805,286 | Baker | Sept. 3, 1957 |
| 2,807,004 | Pouliart et al. | Sept. 17, 1957 |
| 2,856,595 | Selmer | Oct. 14, 1958 |